(No Model.)

R. C. FAY.
BICYCLE WHEEL.

No. 570,250.

Patented Oct. 27, 1896.

Witnesses:
Raphael Netter
Edwin B. Hopkinson.

Rimmon C. Fay
Inventor,
by
Kerr & Curtis
Attorneys

UNITED STATES PATENT OFFICE.

RIMMON C. FAY, OF ILION, NEW YORK, ASSIGNOR TO THE REMINGTON ARMS COMPANY, OF NEW YORK, N. Y.

BICYCLE-WHEEL.

SPECIFICATION forming part of Letters Patent No. 570,250, dated October 27, 1896.

Application filed January 28, 1896. Serial No. 577,108. (No model.)

*To all whom it may concern:*

Be it known that I, RIMMON C. FAY, a citizen of the United States, and a resident of Ilion, county of Herkimer, and State of New York, have invented certain new and useful Improvements in Bicycle-Wheels, of which I declare the following to be a full, clear, and exact description, reference being had to the accompanying drawings, forming a part of this specification.

Heretofore it has been customary, in constructing wheels for bicycles, to form the hub with a flange at or near each end, such flange being perforated near its periphery with holes generally extending obliquely downward. The inner end of a spoke having been inserted in one of these holes is bent or headed to prevent its removal or displacement, and its outer end is attached to the wheel-rim. The arrangement of the inner ends and their adjustment has been varied considerably, but the flanges have heretofore been deemed essential parts of the hub. In constructing a hub of this kind a metal shaft of an external diameter equal to that desirable for the spoke-flange is cut in requisite lengths, which are turned, swaged, or stamped so as to leave intermediate between the flanges a hub of much less diameter than they, and also to form outside of the flanges ball-cups of an external diameter intermediate between that of the hub and that of the flange. In addition to the expense entailed by the requirement of a variety of tools and the construction of costly machinery for producing such a hub it is necessary to apply special grinding and polishing tools of various sorts, owing to the number of surfaces presented. In the plating-bath, again, the irregular surfaces add to the cost of the finished hub by greatly retarding the process. As I shall show, these and various other disadvantages incident to the construction of a bicycle-wheel, such, for example, as a necessity for careful adjustment and truing of its various parts, are done away with by my invention.

Figure 1:
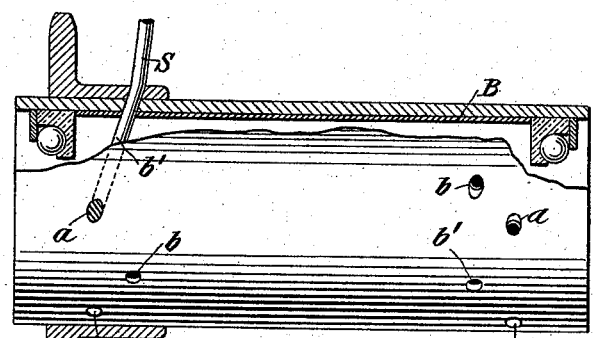
Figure 2:
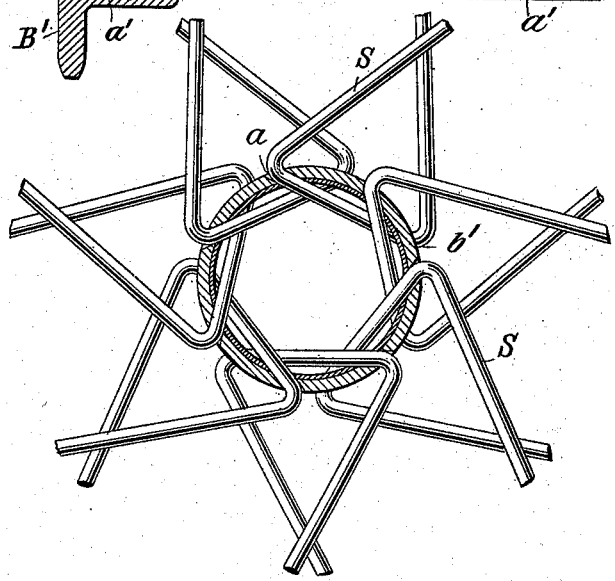
Figure 3:
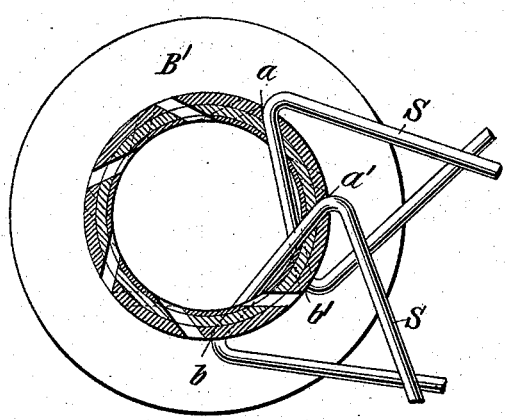
Figure 4:
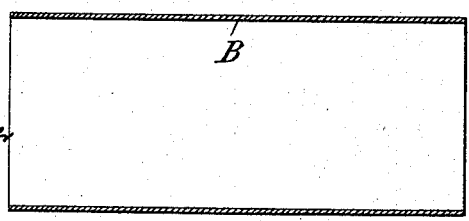

In the accompanying drawings, in which like letters of reference indicate corresponding parts, Figure 1 is a view of the exterior of my hub, partly in section, to show the position of the ball-pockets therein. Fig. 2 is a cross-section of the hub, showing an arrangement of the spoke-wires. Fig. 3 is a cross-section of a rear wheel-hub, showing the sprocket-flange in place thereon. Fig. 4 shows an inner tube for the hub.

From a piece of tubing of the required thickness and bore to form a hub I cut a suitable length A. From a tubing of slightly less diameter I cut a shorter length B. The piece B, which fits tightly in A, forms a shoulder against which the ball-pockets abut, as shown in Fig. 1. I drill A and B thus joined with a row, or preferably rows, of spoke-holes a short distance from each end. In the construction shown in the accompanying drawings, which is preferred, two rows of holes $a$ $a'$ $a^2$ $b$ $b'$ $b^2$ are cut at each end at such an angle to the cross-diameter of the hub that the hole $a$ will be in line with the hole $b$; but this arrangement is unessential. It is designed that a spoke-wire S shall be pushed from $a$ through $b'$, each end thereof being long enough to extend outwardly to the rim of the wheel. The portion of the spoke within the hub is bent, as illustrated in Fig. 1, or it may be flattened or twisted to prevent displacement of the spoke with reference to the hub.

The construction which I have described is intended to be typical only, for it is evident that any number of rows of holes may be used or that substantially the same construction may be adapted to a single row of holes. For example, the spokes may be threaded through alternate holes and the portion included within the hub twisted out of alinement, so as to prevent withdrawal and avoid interference with the outer spokes. The hub for the rear wheel may be formed separately from the sprocket-flange B' and the latter fitted thereon and the spoke-holes then drilled through both, the spokes thus performing the additional function of permanently joining the hub and the flange, as is shown in Fig. 3.

It is of course not necessary that the spoke-holes in the hub should be in line with one another, as described above, or that they should be cut obliquely to the cross-section of the hub. Any construction whereby a single spoke or wire extends inwardly from the wheel-rim, passes into the tubular hub at one point and out at another, thence outwardly to the wheel-rim at a point other than that of its inception is comprehended in my invention. It is also evident that, if desired, a spoke-wire may run, for example, from the hole marked $b'$, near the left of Fig. 1, longitudinally through the tube to the hole marked $b$ at the right, each of the ends extending outwardly to the wheel-rim. In such a construction it might be expedient to fasten the ends of the spoke-wire at or near the same point in the wheel-rim. This and many other modes of threading the spoke-wires will occur to any one skilled in the art.

If a spoke-wire have a portion of its length included within the bicycle-hub in such a manner that there is no interference with the included portions of the other spoke-wires or with the axle, it will be comprehended within my invention.

It will be seen that a single stroke of the tool cutting the tubing, followed by the punching or drilling of the spoke-holes, renders the hub ready for polishing or plating, unless it be deemed expedient to apply these processes to the tubing before cutting. In either case all the expense shown above to be incident to the old methods of constructing hubs is done away with. Another great advantage of my invention is the ease and accuracy with which the parts of the wheel can be assembled. The spoke-wires being all cut to the same length, the result of threading them through the hub and attaching their ends to the rim of the wheel is to fix the hub accurately in the center of the wheel and avoid the heretofore troublesome and delicate operation of adjusting the spokes for the purpose of truing the wheel. It will be found that when the wheel is in use the spokes coact to hold the hub firmly in its central position and to resist any tendency to horizontal or centrifugal displacement.

The use of the inner tube B constitutes an easy and cheap way of forming a shoulder against which the ball-pockets abut.

I desire to claim, broadly, the combination of the tubular hub, with the spokes connected as herein described, whether the hub be composed of one or more tubes.

What I claim for my invention is—

1. In a wheel for bicycles or other vehicles, the combination of a rim and a tubular hub perforated at either end with a plurality of rows of holes, with spoke-wires extending through the hub between holes in adjacent rows, and having their opposite ends connected to the rim; substantially as described.

2. In a wheel for bicycles or other vehicles, the combination of a hub and a rim, with spoke-wires extending through two perforations in the hub, the portion of the wire included in the hub being bent out of alinement with the portions thereof outside of the hub, and the opposite ends of the wire connected to the rim; substantially as described.

3. In a wheel for bicycles or other vehicles, the combination of a tubular hub provided with a plurality of rows of holes at either end, with a plurality of spoke-wires, each extending through two perforations in the hub and having the portion of its length which is included in the hub out of alinement with the portions of its length which are outside of the hub; substantially as and for the purposes described.

RIMMON C. FAY.

Witnesses:
F. N. QUAIFE,
J. M. O'ROURKE.